United States Patent
Kirby, III et al.

(10) Patent No.: US 6,435,825 B1
(45) Date of Patent: Aug. 20, 2002

(54) HOLLOW NOZZLE PARTITION WITH OPTIMIZED WALL THICKNESS AND METHOD OF FORMING

(75) Inventors: George Horner Kirby, III, Charlton; Mark Arne Florin, Ballston Spa, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,452

(22) Filed: Apr. 10, 2001

(51) Int. Cl.$^7$ ................................................. F01D 9/02
(52) U.S. Cl. ..................... 415/191; 416/232; 29/889.72
(58) Field of Search ................................ 416/233, 232, 416/97 R, 96 R; 415/191, 208.2, 208.1; 29/889.72

(56) References Cited

U.S. PATENT DOCUMENTS

| | | | | |
|---|---|---|---|---|
| 1,706,703 A | * | 3/1929 | Murray | 144/259 |
| 3,627,443 A | * | 12/1971 | Pirzer | 415/115 |
| 3,729,930 A | * | 5/1973 | Williams | 415/116 |
| 4,507,051 A | * | 3/1985 | Lesgourgues et al. | 416/213 R |

* cited by examiner

Primary Examiner—Edward K. Look
Assistant Examiner—Kimya N McCoy
(74) Attorney, Agent, or Firm—Nixon & Vanderhye PC

(57) ABSTRACT

A welded hollow nozzle partition formed from sheet metal and having a concave side and a convex side, includes an interior plate welded to an inner surface of the partition. The interior plate serves to strengthen the outer walls of the partition to withstand wall buckling and ballooning under certain operating conditions.

8 Claims, 2 Drawing Sheets

HOLLOW NOZZLE PARTITION WITH OPTIMIZED WALL THICKNESS AND METHOD OF FORMING

BACKGROUND OF INVENTION

The invention relates to a hollow nozzle partition used in, for example, a boiling water reactor (BWR) environment, and, more particularly to a hollow nozzle partition with plates welded onto inner sidewalls of the partition to prevent wall buckling or ballooning under certain operating conditions.

Hollow nozzle partition designs are used in fossil-fueled steam generating plants and reach lengths of at least 33.5". As shown in FIG. 1, a hollow nozzle partition is formed from two curved metal plates, a convex plate 10 and concave plate 12, joined along their seams 14, 16, typically, by welding. End cap 11 may be welded at one (or both open ends) to form an enclosed hollow nozzle partition. Only one end cap 11 is needed where the other open end is closed off by attachment of the hollow nozzle partition to a turbine ring or the like.

Pressurized water reactor (PWR) nuclear power plants also currently use hollow nozzle partitions. The hollow nozzle partitions provide substantial cost savings versus solid partitions in nuclear, low-pressure, environments where partition lengths reach roughly between 38" and 52".

When hollow nozzle partitions are welded or attached by other means to either or both of the inner and outer rings of a turbine they act as a quasi-pressure vessel. If any moisture leaks into the hollow nozzle partition through a weld or other point of porosity, the water flashes to steam, upon reaching a critical temperature, and creates enough pressure to yield the sidewall of the partition. This type of partition failure mode has been termed "ballooning" and is preceded by wall buckling.

Although solid partitions do not encounter ballooning and wall buckling failure modes and therefore do not experience this problem the cost savings associated with hollow partitions make it desirable to solve these problems. The previous designs that utilized hollow nozzle partitions in fossil-fueled steam generator plants also encountered these failure modes. The conventional solution to this problem has been to drill two ¼" diameter holes 18 in the sidewall of the partition (one on each end), to allow the partition to vent, as shown in FIG. 1.

Nuclear units are intrinsically wet environments where relative humidity can reach 11% or higher at the last stage diaphragm in the low-pressure section. A result of this moisture running through the unit is increased erosion of the steel components, thus causing small particulates to travel along the steam path. In a BWR (boiling water reactor) power plant, water passes and comes in contact with the reactor core (this is opposed to a PWR unit where the water is contained within piping and does not come into contact with the core). Any suspended solids due to erosion will become irradiated by the reactor core and will thus be carried by the steam throughout the turbine.

Once these irradiated particles become lodged in small cracks, holes and crevices, they create "hot"spots of radiation contamination. This contamination needs to be avoided during outages where componentry is cleaned and repaired because of adverse biological effects to the workers. Accordingly, the conventional solution cannot be used in nuclear units and is especially not suitable in a BWR environment.

SUMMARY OF INVENTION

The above described problems in the prior art hollow nozzle partitions are solved by the present invention which incorporates at least one welded plate onto at least one of the hollow partition inner sidewalls. The welded plates prevent wall buckling and ballooning failure modes by optimizing the wall thickness and strength to withstand any sudden increase in internal pressure caused by steam flash due to entrapped moisture.

The welded plate need not extend completely from one inner side wall to the opposite facing inner side wall, nor need it extend along the entire length of the partition. The ability of the hollow nozzle partition to withstand wall buckling and ballooning can be achieved by a plate that only extends partly into the interior of the hollow nozzle partition and only partly along the length of the hollow nozzle partition. Multiple plates can be welded onto one or more inner surfaces of the hollow nozzle partition.

The invention provides the advantages of reduced cost, weight, and machining complexity as compared to conventional nozzle partition designs. Theses advantages result from the use of lighter grade steel for the hollow nozzle partition plates, since increased strength can be realized by employing the interior plates.

DETAILED DESCRIPTION

Figure 1:
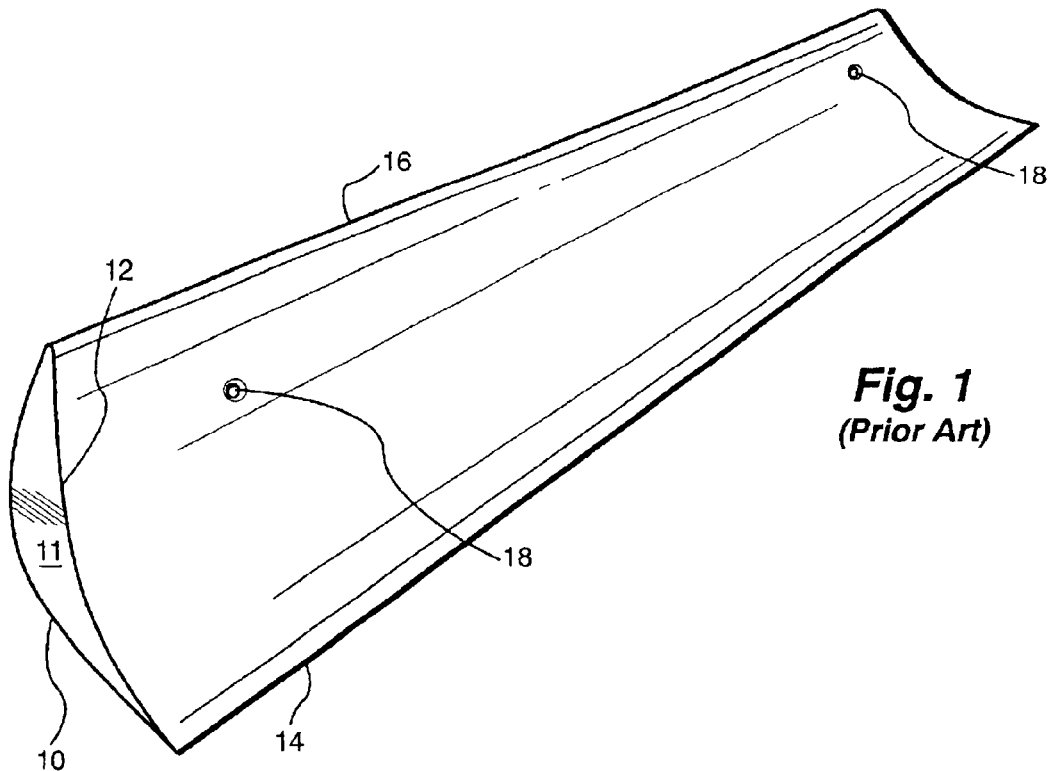
FIG. 1 is a conventional prior art hollow partition with vent holes.
Figure 2:
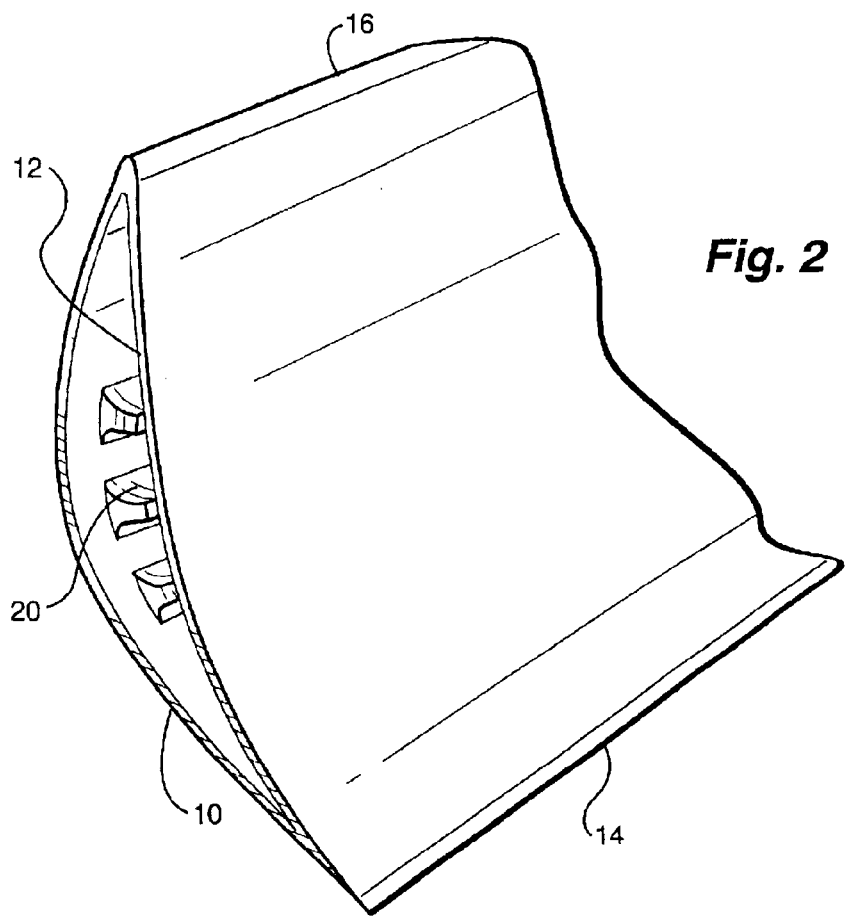
FIG. 2 is a perspective view of a first exemplary embodiment of the present invention.

As shown in FIG. 2, the invention comprises convex half partition 10 and concave half partition 12 which are formed out of sheet metal and then welded along seams 14, 16, and machined to the final shape. At least one plate 20 is then welded onto an inner surface of convex half partition 10. By welding plates 20 onto the surface of convex half partition 10 prior to final assembly with concave half partition 12, a stiffening effect takes place thus increasing the critical buckling and yielding stresses of the sidewalls. As will be readily recognized by those skilled in the art, plate 20 could be welded onto the inner surface of convex half partition 10 before welding it to concave half partition 12, with the same stiffening effect resulting. End caps have not been shown in any of FIGS. 2–4 so that the details of the interior plates can be shown.

Figure 3:
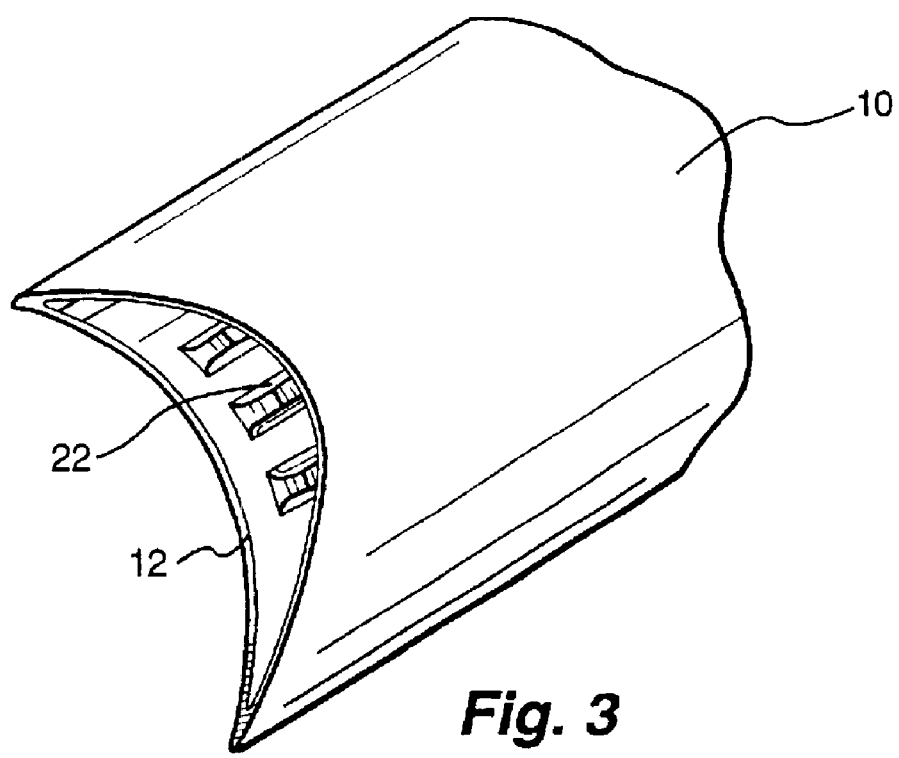
FIG. 3 is a perspective view of a second exemplary embodiment of the present invention.

In a second embodiment, shown in FIG. 3, at least one plate 22 is welded onto an inner surface of concave half partition 12. As in the case of the first embodiment, plate 22 can be welded onto an inner surface of concave half partition 12 before or after it is assembled with convex half partition 10.

Figure 4:
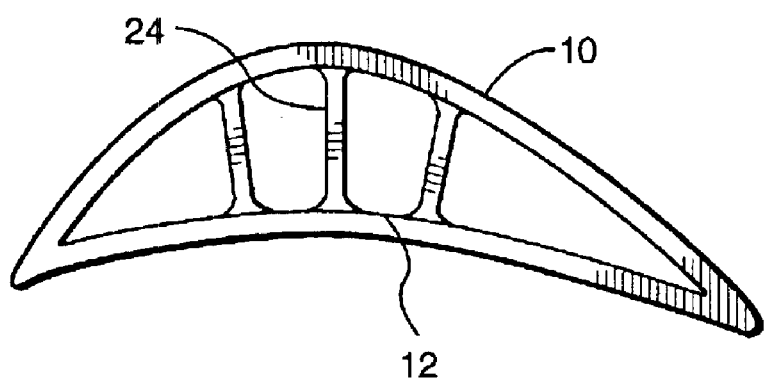
FIG. 4 is a perspective view of a third exemplary embodiment of the present invention.

In a third embodiment, shown in FIG. 4, one or more plates 24 are welded to both half partitions 10 and 12. Plates 24 provide even greater stiffening effect by extending from one side to the other of the hollow nozzle partition.

Another instance of this invention would be to weld one or more plates to either adjacent inner wall surface from the open partition end once the partition has been assembled. Accordingly, the aspect ratio of the sidewall is reduced and, thus, the susceptibility to ballooning is reduced. This arrangement also increases the overall stiffness of the partition.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A hollow nozzle partition having a first half partition with a concave surface and a second half partition with a convex surface, said first and second half partitions being welded together, said partition further comprising at least one interior plate welded to one inner surface of either one of said first and second half partitions said at least one interior plate partially projecting into an inner space formed between said first and second half partitions, said at least one interior plate extending from only one of said partitions and said the other one of said partitions being free of any other interior plate.

2. The hollow nozzle partition of claim 1, said at least one interior plate being welded to said first half partition.

3. The hollow nozzle partition of claim 2, said at least one interior plate extending partially along the length of said first and second half partitions.

4. The hollow nozzle partition of claim 1, said at least one interior plate being welded to said second half partition.

5. The hollow nozzle partition of claim 3, said at least one interior plate extending partially along the length of said first and second half partitions.

6. The hollow nozzle partition of claim 1, said at least one interior plate extending partially along the length of said first and second half partitions.

7. A method of forming a hollow nozzle partition comprising the steps of:

forming a rectangular piece of sheet metal into a first half partition having a concave surface;

forming a rectangular piece of sheet metal into a second half partition having a convex surface;

welding a rectangular plate along a portion of the length of said first half partition; said at least one interior plate extending from only one of said partitions and said the other one of said partitions being free of any other interior plate; and welding said first and second half partitions together, with said rectangular plate partially projecting into an interior cavity formed between said first and second half partitions.

8. A method of forming a hollow nozzle partition comprising the steps of:

forming a rectangular piece of sheet metal into a first half partition having a concave surface;

forming a rectangular piece of sheet metal into a second half partition having a convex surface;

welding a rectangular plate along a portion of the length of said second half partition; said at least one interior plate extending from only one of said partitions and said the other one of said partitions being free of any other interior plate; and welding said first and second half partitions together, with said rectangular plate partially projecting into an interior cavity formed between said first and second half partitions.

* * * * *